United States Patent [19]

Rouse

[11] 4,426,723

[45] Jan. 17, 1984

[54] X-RAY MARKER DEVICE

[76] Inventor: James S. Rouse, 3758 Mulkey Circle, Marietta, Ga. 30060

[21] Appl. No.: 332,508

[22] Filed: Dec. 21, 1981

[51] Int. Cl.³ .............................................. G03B 41/16
[52] U.S. Cl. ...................................... 378/165; 40/597
[58] Field of Search ........................... 378/165; 40/597

[56] References Cited

U.S. PATENT DOCUMENTS

| | | | |
|---|---|---|---|
| 1,800,218 | 4/1931 | Janda | 40/597 |
| 2,433,480 | 12/1947 | Rendich | 378/165 |
| 4,058,733 | 11/1977 | Stembel | 378/165 |
| 4,127,774 | 11/1978 | Marker | 378/165 |

FOREIGN PATENT DOCUMENTS 589567 6/1925 France.
309104 6/1933 Italy.

*Primary Examiner*—Alfred E. Smith
*Assistant Examiner*—T. N. Grigsby
*Attorney, Agent, or Firm*—Jones & Askew

[57] ABSTRACT

An X-ray marker device. The device comprises a body member and a single suction cup attached to the bottom of the body member. X-ray opaque indicia are formed on the face of the body member. The suction cup temporarily secures the body member to a substantially flat surface, such as an X-ray film holder.

1 Claim, 7 Drawing Figures

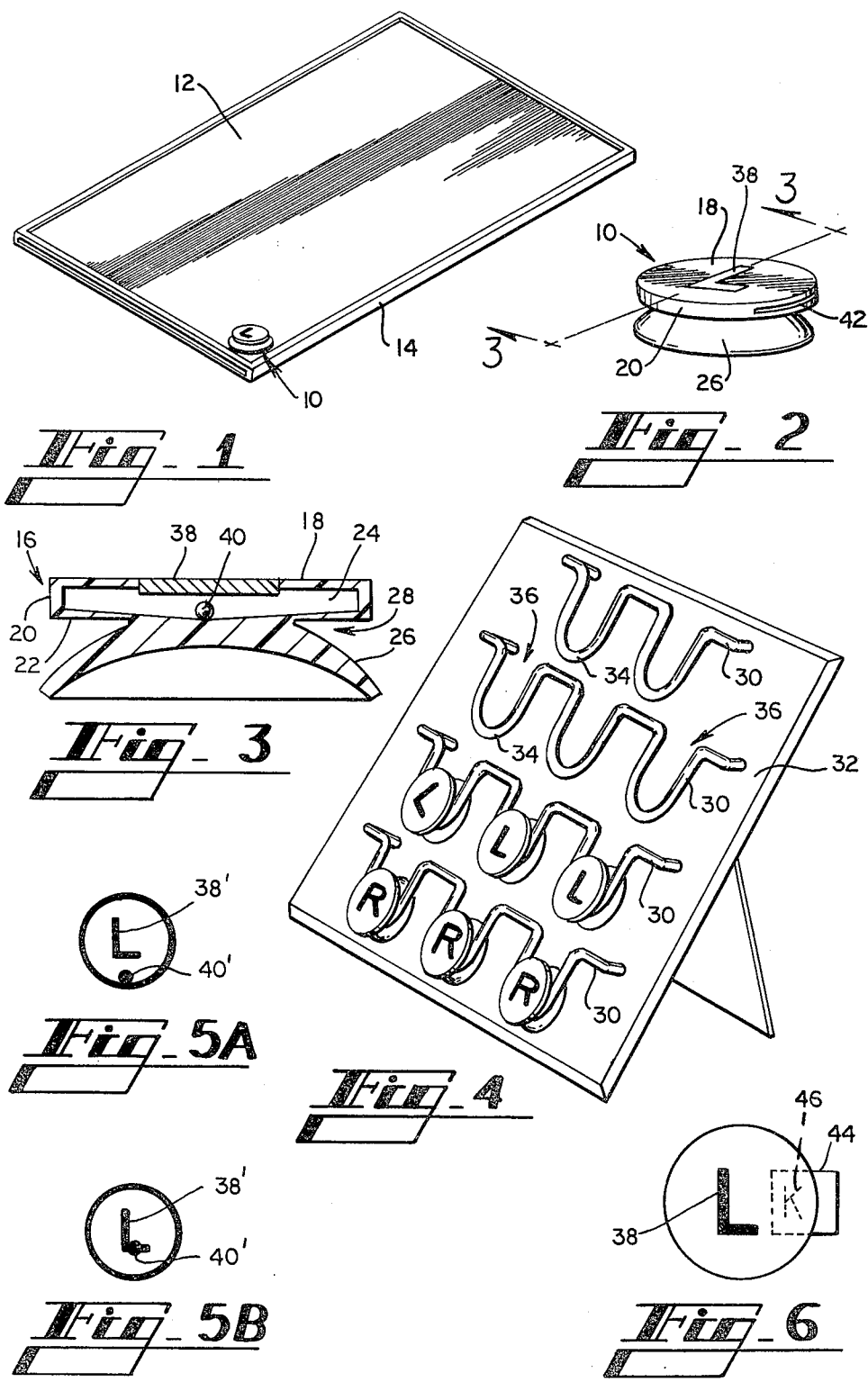

X-RAY MARKER DEVICE

TECHNICAL FIELD

The present invention relates to devices for marking X-ray negatives, particularly, such devices which can be temporarily secured to the substantially flat surface of an X-ray film holder or plate while the film is being exposed.

BACKGROUND

An X-ray negative is prepared by exposing a sheet of X-ray sensitive film to a source of X-ray radiation with the object of interest placed in alignment between the film and the X-ray source. The object being X-rayed absorbs the radiation non-uniformly depending on various criteria, such as type of material and material thickness or density. The radiation which is transmitted through the object to the film, accordingly, is also non-uniform and results in a pattern of light and dark areas on the developed film (negative) corresponding to the absorptivity of the object. With proper training, the X-ray negative can be interpreted to reveal characteristics of the object not normally visible to the human eye.

Although X-rays have a wide variety of industrial uses, they are probably most extensively used in the field of medicine. Regardless of the application of X-rays, it is helpful in interpreting an X-ray negative to know the orientation of the object X-rayed and the orientation of the film when exposed to the radiation. It has therefore been the typical practice for X-ray technicians to place X-ray opaque objects, such as lead letters, on the X-ray film holder during exposure, so that the "shadow" of the letters will appear on the X-ray negative and thereby give a permanent visual indication of film and object orientation at the time the X-ray was made. It is also often desirable to provide an indication of the X-ray technician who prepared the X-ray. Accordingly, lead letters or numbers corresponding to individual X-ray technicians or other information can be placed on the film holder in the same manner described above. The use of individual lead letters and the lack of a convenient method for attaching the letters to the film holder makes this method of marking X-rays awkward since the letters can be lost or fall off the film holder when the film holder is in a non-horizontal orientation.

The foregoing problems were recognized in U.S. Pat. No. 4,127,774 (incorporated herein by reference). That patent discloses an X-ray marker which includes lead indicia to provide an indication of right or left orientation and operator initials. A quantity of mercury contained in an asterisk-shaped cavity provides an indication of vertical or horizontal orientation. Furthermore, the marker device is securable to film holders by a multiplicity of suction cups on the back of the marker device. That device is not entirely satisfactory because of its size. Moreover, since multiple suction cups are used, a relatively large flat surface is required to attach the marker device thereto and adhesion of the marker device can be undependable despite the multiple suction cups and corresponding surface area covered by the cups.

Other patents which may be relevant to the subject matter of the present application include U.S. Pat. Nos. 1,800,218 and 1,883,791 (both incorporated herein by reference). Although those patents disclose suction cup devices, they do not relate to X-ray marker devices, and, therefore, are not material to the subject matter of the present invention.

SUMMARY OF THE INVENTION

The present invention relates to an X-ray marker which can be temporarily secured to a substantially flat surface, such as an X-ray film holder. The X-ray marker comprises a body member having a single suction cup attached thereto to temporarily secure the body member to substantially flat surfaces. At least one X-ray opaque indicum is formed in the body member.

Accordingly, it is an object of the present invention to provide an improved X-ray marker.

Another object of the present invention is to provide an X-ray marker which is easily attachable to flat surfaces.

Yet another object of the present invention is to provide an X-ray marker which carries interchangeable indicia.

A further object of the present invention is to provide an X-ray marker mountable on a hanger for convenient storage.

These and other objects, features and advantages of the present invention will become apparent after a review of the following detailed description of the disclosed embodiment and the appended drawing and claims.

BRIEF DESCRIPTION OF THE DRAWINGS

FIG. 1 is a pictorial view of a disclosed embodiment of the X-ray marker of the present invention shown attached to an X-ray film holder.

FIG. 2 is a pictorial view of the X-ray marker shown in FIG. 1.

FIG. 3 is a cross-sectional view taken along the line 3—3 of the X-ray marker shown in FIG. 2.

FIG. 4 is a pictorial view of a plurality of the X-ray markers shown in FIG. 1 secured to a plurality of hangers.

FIG. 5A is a schematic view of the image left on an exposed X-ray negative by the X-ray marker shown in FIG. 1 when the film holder is exposed in a vertical position.

FIG. 5B is a schematic view of the image left on an exposed X-ray negative by the X-ray marker shown in FIG. 1 when the film holder is exposed in a horizontal position.

FIG. 6 is a top plan view of the x-ray marker shown in FIG. 2 with a card inserted into the edge opening shown partially in dotted line.

DETAILED DESCRIPTION OF THE DISCLOSED EMBODIMENT

Referring now to the drawing in which like numbers indicate like elements throughout the several views, it will be seen that there is an X-ray marker 10 in accordance with the present invention temporarily secured to a substantially flat surface 12 of a conventional X-ray film holder 14. The X-ray marker 10 includes a disc-shaped body member 16 having a face 18, an edge 20 and a bottom 22 which define a centrally located chamber 24. Attached to the bottom 22 of the body member is a single conventional suction cup 26. The diameter of the body member 16 is approximately equal to the diameter of the suction cup 26 so that the size of the X-ray marker is minimized.

The curvature of the suction cup 26 is directed away from the bottom 22 of the body member 16 so that an annular groove 28 is formed between the body member and the suction cup. The groove 28 is sized and shaped to receive a hanger member, such as a heavy gauge wire 30 (FIG. 4).

A plurality of such wires 30 are shown attached to a board 32. The wire 30 is bent so that a plurality of loops 34 each having an open end 36 are provided. Thus, it will be appreciated by those skilled in the art that the X-ray marker 10 can be slipped into a loop 34 through the open end 36 thereof and the wire 30 received in the groove 28. The wire 10 is spaced outwardly from the surface of the board 32 a distance approximately equal to or slightly greater than the distance from the bottom surface 22 to the bottom 34 of the suction cup 26 so that when the wire is received in the groove 28, the suction cup 26 is captured between the wire and the surface of the board. To remove the X-ray marker 10 from the wire 30, the wire is disengaged from the groove by merely slipping it out the open end 36 of the loop 34. Thus, the X-ray marker 10 can be conveniently stored and retrieved from the hangers on the board 32, when not actually applied to a film holder 14.

Formed in the face 18 of the body member 16 is an X-ray opaque indicia, such as the letter "L" 38 or the letter "R" which may stand for "left" or "right." The indicia can conveniently be made of lead, which is both relatively easy to form into a desired shape and which is also substantially X-ray opaque.

Disposed within the chamber 24 is a ball 40 which is also made of an X-ray opaque material, such as lead. The ball 40 is of a size such that it is free to move about the chamber 24. The bottom 22 of the body member 16 is sloped downwardly from the edges 20 toward the central portion thereof. The bottom of the chamber 24 therefore has a centrally located depression toward which the ball 40 will roll when the marker 10 is in a horizontal position. When the marker 10 is in a non-horizontal position, the effect of gravity on the ball 40 will displace it from the central portion toward the edges 20.

Formed in the edge 20 of the body member 16 is a slit 42. The slit 42 extends through the edge 20 into the chamber 24. The slit 42 is sized and shaped to receive a tab or card 44 having an X-ray opaque indicia, such as a "K" 46, printed thereon. The slit, however, is not large enough to permit the ball 40 to pass therethrough. When the card 40 is inserted into the slot, as shown in FIG. 6, a second X-ray opaque indicia can be oriented adjacent the first indicia formed in the face 18.

Operation of the X-ray marker device will now be considered. A piece of X-ray film (not shown) is placed in the X-ray film holder 14 in the conventional manner. One of the X-ray markers 10 is removed from the hanger board 32 by slipping it out of the open end 36 of the loop 34. The X-ray marker 10 is then placed on the flat surface 12 of the film holder 14 in a desired location, such as the lower right hand corner, with the suction cup 26 in contact therewith. The X-ray marker 10 is then pushed downwardly toward the film holder 14 so that the suction cup 26 is slightly flattened. When the X-ray marker 10 is released, a partial vacuum is created between the suction cup 26 and the surface 12 of the film holder 14, thereby temporarily attaching the X-ray marker thereto. It has been found that the use of only a single suction cup, as in the present X-ray marker, provides significantly improved adhesion of the marker to the X-ray film holder compared with prior art markers which rely on multiple suction cups. It is believed that the several suction cups of multiple-cup markers can become misaligned or distorted as the marker is pressed against the film holder, with the result that the misaligned or distorted suction cups produce forces tendency to dislodge adjacent suction cups and weaken the securement of the overall marker to the film holder.

The X-ray film holder 14 can then be used in the normal fashion. That is, the holder can be placed in alignment with an object to be X-rayed and a source of X-rays so that the shadow of the object will fall on the X-ray film. When the film has been thusly exposed to X-rays and properly developed not only will the shadow of the object X-rayed be visible on the film, but the shadow of the X-ray opaque portions of the X-ray marker will also be visible. Specifically, the indicia on the face 18 of the X-ray marker will be visible as will the ball 40.

FIG. 5A shows the image created by the X-ray marker on a developed film. The image of an "L" 38' and the image of a ball 40' are left on the film. The position of the film holder 14 when it was exposed to the X-rays was substantially vertical, therefore the ball 40 rolled toward the lower edge 20 of the chamber 24 thereby leaving its image 40' displaced from the center of the X-ray image below the "L" 38'. FIG. 5B shows the image left on the film when exposed in a substantially horizontal position. Note that in this case the image of the ball 40' is centrally located.

If it is desired that an additional indicia be provided on the film, such as the initial of the X-ray technician taking the X-ray, the card 44 bearing a second X-ray opaque indicia, such as a "K" 46, can be slipped into the slot 42 in the edge of the body member 16 of the X-ray marker 10. The image left on the film in such a case includes not only the images of the first indicia 38 and the ball 40, but also the image of the second indicia 46.

When the X-ray has been exposed, the X-ray marker 10 can be removed from the surface 12 of the film holder 14 by grasping the body member 16 and pulling sufficiently strongly to overcome the partial vacuum between the suction cup 26 and the surface of the film holder. The X-ray marker 10 can then be conveniently stored by slipping it through the open end 36 of the loop 34 so that the wire 30 engages the groove 28 between the suction cup 26 and the body member 16.

It should be understood, of course, that the foregoing relates only to preferred embodiments of the present invention and that numerous modifications or alterations may be made therein without departing from the spirit and scope of the invention as set forth in the claim.

What is claimed is:

1. An x-ray marker device comprising:
   a unitary member having a first side and having only a single suction cup on said first side so as to temporarily secure said member to a substantially flat surface of an x-ray film holder;
   said unitary member further comprising a second side having a body member unitary with said single suction cup, so that said body member forms said second side of said unitary member and said suction cup forms said first side thereof;
   said unitary member being substantially transparent to x-ray radiation;
   an x-ray opaque indicium formed in said body member so as to cast a characteristic shadow on film in the film holder when subjected to x-ray radiation;

said body member having an upper surface substantially conforming in diameter to the diameter of said single suction cup and facing outwardly from the x-ray film holder, so as to minimize the size of the x-ray marker device; and
an annular groove formed on the exterior of said unitary member between said body member and said single suction cup for selectively receiving a hanger member, so as to facilitate storing said marker device when not in use.

* * * * *